United States Patent
Mijatovic

(10) Patent No.: US 7,370,445 B2
(45) Date of Patent: May 13, 2008

(54) SLUDGE REMOVAL

(75) Inventor: Andrew Mijatovic, Whitehaven (GB)

(73) Assignee: Nukem Limited, Risley (GB)

( * ) Notice: Subject to any disclaimer, the term of this patent is extended or adjusted under 35 U.S.C. 154(b) by 0 days.

(21) Appl. No.: 11/613,921

(22) Filed: Dec. 20, 2006

(65) Prior Publication Data
US 2007/0205164 A1 Sep. 6, 2007

(30) Foreign Application Priority Data
Dec. 21, 2005 (GB) .................... 0525878.5

(51) Int. Cl.
*B01D 33/15* (2006.01)

(52) U.S. Cl. .................... 37/318; 37/317; 210/107; 210/108; 210/357; 210/360; 405/128.25

(58) Field of Classification Search .................. 37/314, 37/317, 318, 321; 210/107, 108, 333.1, 357, 210/460; 405/128.25
See application file for complete search history.

(56) References Cited

U.S. PATENT DOCUMENTS

| | | | | |
|---|---|---|---|---|
| 2,954,873 | A * | 10/1960 | Davis ...................... | 210/333.1 |
| 3,356,215 | A * | 12/1967 | Miles, Jr. .................. | 210/798 |
| 3,425,557 | A * | 2/1969 | Rosaen ...................... | 210/108 |
| 4,377,485 | A * | 3/1983 | Krofta ....................... | 210/704 |
| 4,639,315 | A | 1/1987 | Fuchs | |
| 4,781,825 | A * | 11/1988 | Grimes et al. ............. | 210/107 |
| 5,128,029 | A * | 7/1992 | Herrmann .................. | 210/107 |
| 5,855,799 | A * | 1/1999 | Herrmann .................. | 210/780 |

* cited by examiner

*Primary Examiner*—Gary S Hartmann
(74) *Attorney, Agent, or Firm*—William H. Holt

(57) ABSTRACT

A sludge removal apparatus includes a sludge removal head (10) with a sludge suction duct and an water supply duct with open end portions alongside each other, and a filter (32) adjacent to the open ends of the suction duct (36) and the water supply duct (38) so that the sludge is extracted through the filter (32). A drive mechanism moves the filter so that regions of the filter pass successively over the open ends of the suction duct, where it may become partially blinded with sludge, and then over the water supply duct where it is backwashed.

7 Claims, 5 Drawing Sheets

SLUDGE REMOVAL

The present invention relates to a sludge removal apparatus that can be immersed into liquid and which can be used to retrieve and remove settled sludge from the liquid, and to a method using such an apparatus.

BACKGROUND OF THE INVENTION

Sludge and debris tend to collect at the bottom of bodies of water both in natural ponds and lakes as well as artificial structures such as ponds used to store radioactive waste. It is required at times to remove/retrieve the sludge to recover contamination from the bottom of these bodies of water without having to remove the water.

Certain types of radioactive waste (such as spent MAGNOX reactor fuel) are stored underwater in storage ponds to provide shielding and cooling of the waste, and in this case a sludge can be formed with time due to for example the material suffering corrosion with the formation of magnesium hydroxide. This sludge will typically be radioactive. The sludge build up can cover other plant, equipment and systems contained within the storage pond. Periodically the build up of sludge needs to be removed. If the pond structure was to fail, for example owing to an earthquake, then the water and agitated sludge could escape into the environment.

A currently known method for the removal/retrieval of such sludge is to extract the sludge (using suction) via a pipe protected by a mesh filter typically with 6 mm diameter holes to prevent larger items of debris being sucked into the system. Typical experience with MAGNOX sludge confirms that filter meshes with holes of this size blind very quickly resulting in the loss of desludging efficiency and thereby requiring downtime to remove the system from the storage pond to carry out routine backwashing and cleaning. This potentially may result in the operating personnel receiving higher doses of radiation. It would therefore be desirable to be able to avoid the need remove the head to remove blinding material from the mesh filter.

SUMMARY OF THE INVENTION

According to the present invention there is provided a sludge removal apparatus incorporating a filter defining a multiplicity of apertures through which fluidised sludge can pass, means for fluidising sludge in the vicinity of the front face of the filter, and means for backwashing the filter during operation.

Preferably the apparatus comprises a sludge removal head incorporating a sludge suction duct and a water supply duct with open end portions alongside each other, the filter being adjacent to the open ends of the suction duct and the water supply duct, and the apparatus comprising a mechanism for moving the filter so that regions of the filter pass successively over the open ends of the suction duct and then of the water supply duct.

For dealing with potentially radioactive material the moving mechanism preferably incorporates a hydraulic drive motor, as this is less subject to damage from radiation. Preferably the filter is rotated by this mechanism. Preferably the filter has apertures of such a size as to prevent larger particles of material such as cladding form being sucked up the suction duct, and the apertures would typically be of width in the range between 2 mm and 10 mm, preferably between 4 mm and 8 mm, for example 6 mm. The filter may be in the form of a wire mesh, or a perforated plate.

The filter protects the sludge suction duct from becoming blocked with large particulates. As the filter is constantly rotated by the drive system, filter wash water is fed down the water supply duct and discharges through the filter, thereby acting as a continuous backwash. Any large particulates or other debris that could blind the filter are immediately washed off by the filter wash water. This ensures that the filter is constantly cleaned, allowing continuous sludge retrieval/removal operations. As well as cleaning the filter the filter wash water also acts as a fluidising water jet to fluidise the settled sludge, improving extraction via the sludge suction duct. It will be appreciated that the volume flow through the sludge suction duct should be greater than that through the water supply duct.

Preferably the head also incorporates at least one outlet to form a water jet at the periphery of the mesh filter. Such water jets not only prevent the build up of sludge deposits between the filter and the other components of the sludge removal head, but also assist in fluidising the settled sludge, so improving the extraction process.

Preferably the sludge removal head also incorporates a framework to protect the filter. For example this may consist of a cage, for example of 6 mm diameter bars projecting 150 mm away from the filter. This framework prevents the filter and jetting nozzles from becoming damaged as a result of impacts, maintains a steady distance between the filter and the bed of sludge, and acts as a guide to enable the head to be fed into gaps between fuel skips stored in the pond.

BRIEF DECRIPTION OF THE DRAWINGS

The invention will now be further and more particularly described, by way of example only, and with reference to the accompanying drawings, in which.

DETAILED DESCRIPTION OF THE INVENTION

Figure 1:
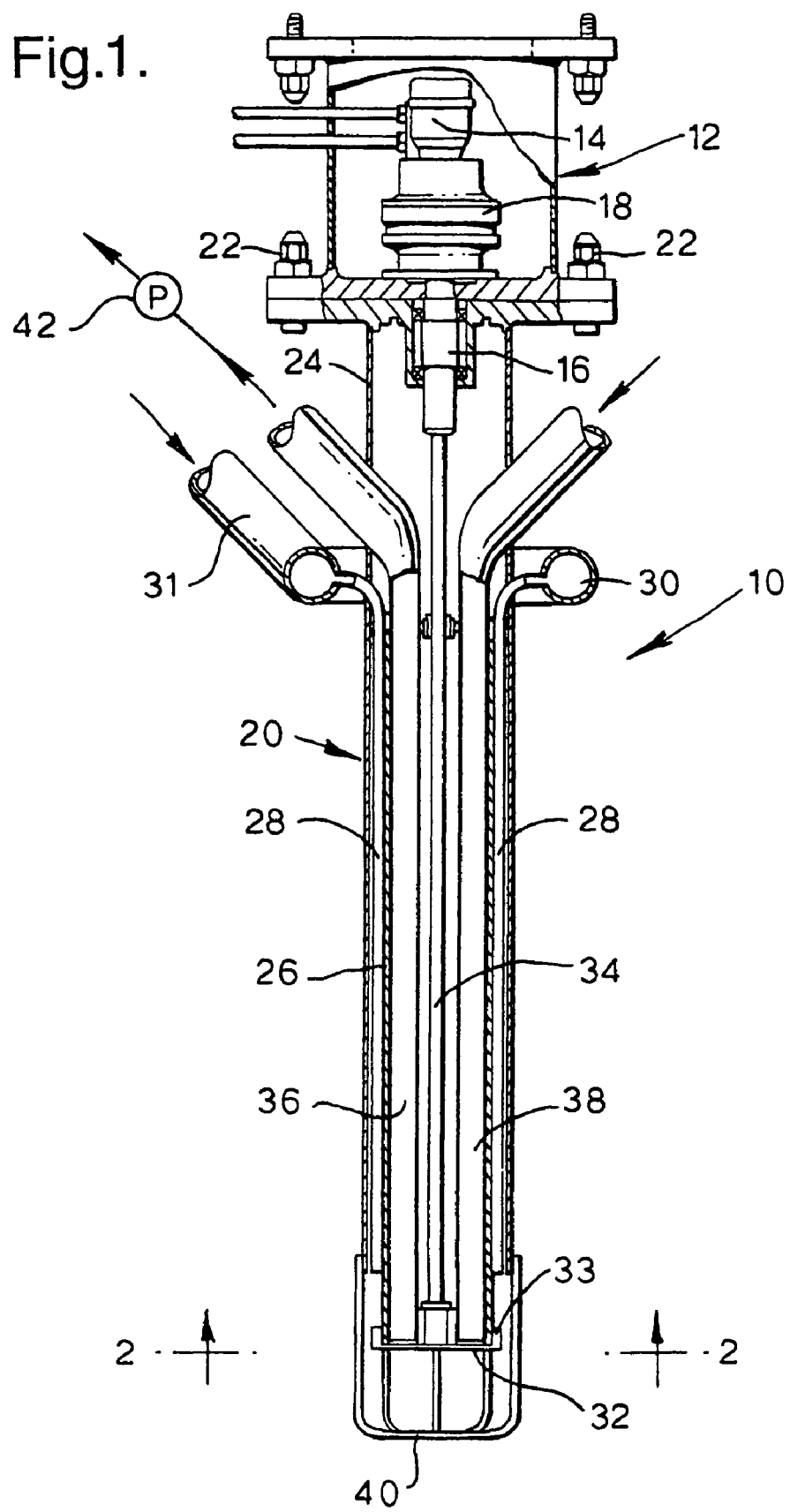
FIG. 1 shows a longitudinal sectional view of a sludge removal head of the invention.

Referring now to FIG. 1, a sludge removal head 10 incorporates an upper unit 12 enclosing a hydraulic motor 14 driving an output shaft 16 through a gearbox 18. The upper unit 12 is connected to a lower unit 20 by bolts 22. The lower unit 20 consists of a stainless steel pipe 24 which in this example is of diameter about 235 mm and the lower unit 20 is of overall length about 2.4 m. Most of the lower section of the pipe 24 encloses a second, concentric pipe 26, and this projects some 150 mm beyond the bottom of the pipe 24. Within the annular space between the pipes 24 and 26 are sixteen equally spaced narrow tubes 28, open at their lower and (which is at the same level as the end of the outer pipe 24), and at their upper ends emerging through the outer pipe 24 to communicate with an annular header pipe 30 with an inlet pipe 31.

Figure 2:
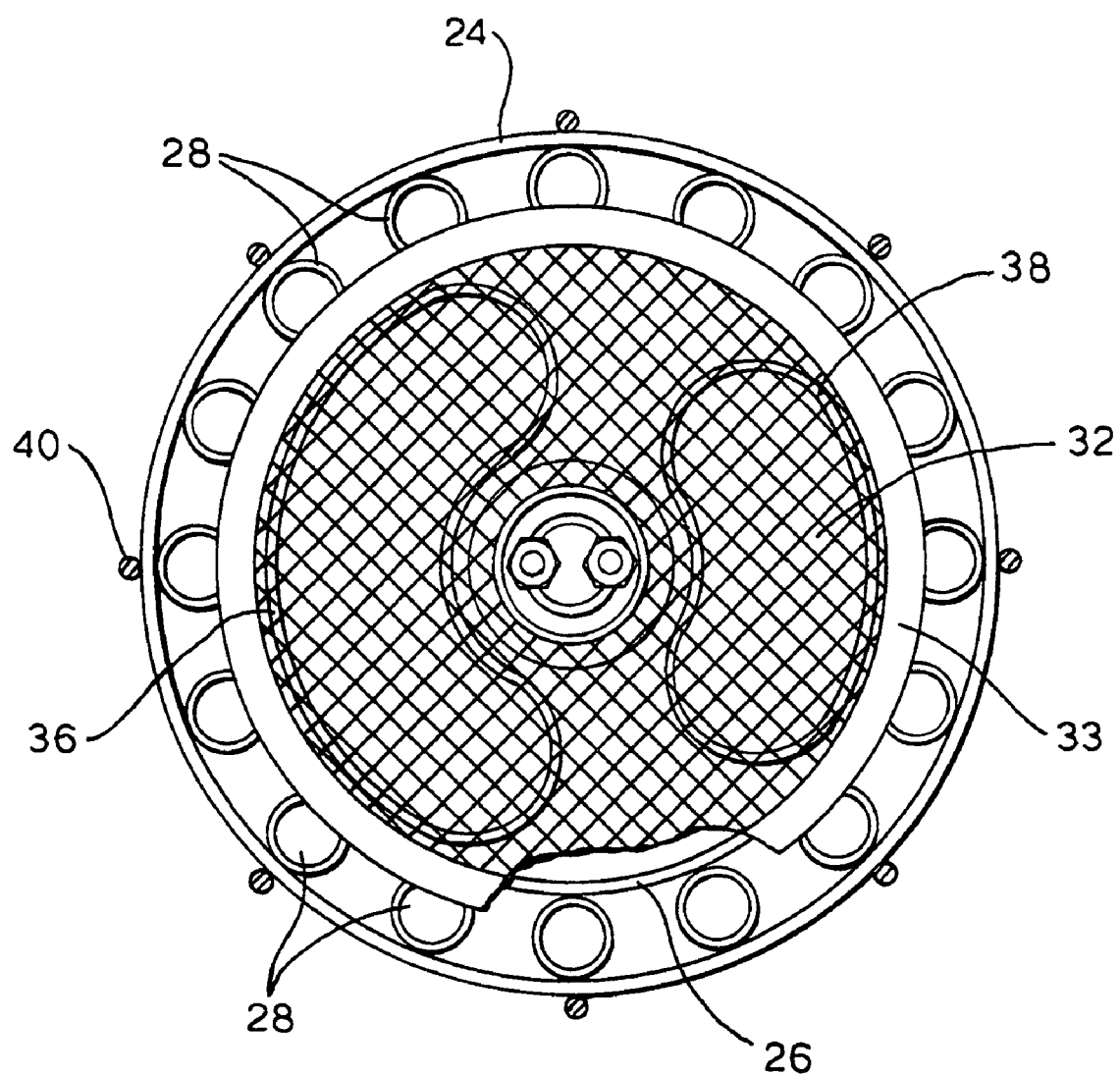
FIG. 2 shows a sectional view on the line 2-2 of FIG. 1.

Referring also to FIG. 2, the lower end of the inner pipe 26 is covered by a circular mesh filter 32 with 6 mm apertures, this having a peripheral flange 33 which fits loosely around the end of the pipe 26; the mesh filter 32 is bolted onto the bottom end of a drive shaft 34 whose upper end is connected to the output shaft 16. (The flange 33 is shown partly broken away in FIG. 2.) A sludge extract pipe 36 and a water supply pipe 38 extend within the inner pipe 26; on opposite sides, each with an open end just above the mesh filter 32; as shown in FIG. 2 the open end of the sludge extract pipe 36 has an arcuate shape, so that its cross-sectional area is about twice that of the water supply pipe 38. Both these pipes 36 and 38 emerge through the outer pipe 24 near its upper end, and may be connected to hoses (not shown).

The mesh filter 32 is further protected by a cage 40 of 6 mm stainless steel bars enclosing a generally rectangular space about 150 mm below the mesh filter 32 and at their upper end being welded to the outer pipe 24.

In use of the sludge removal head 10 fluidising water is fed through the inlet pipe 31 to the annular header pipe 30; filter wash water is fed into the water supply pipe 38; and a sludge/water mixture is extracted through the sludge extract pipe 36 (which is connected to a suitable pump 42, shown diagrammatically). The hydraulic motor 14 is operated so that the mesh filter 32 gradually rotates, so that if any parts of the mesh filter 32 become blinded by sludge or debris as they pass across the open end of the sludge extract pipe 36, they are backwashed and cleaned as they pass across the open end of the water supply pipe 38. Water jets emerging from the tubes 28 liquidise the adjacent sludge, and also remove any sludge deposits from the flange 33 of the mesh filter 32.

The overall length of the sludge removal head 10 is designed to allow it to be lowered between fuel skips contained within a pond while leaving the larger diameter drive unit (in the upper unit 12) above the boxes. For use in different conditions the length of the sludge retrieval head 10 can be decreased or increased as the conditions dictate.

The key parameters of the sludge retrieval head can be modified to suit a particular application, however the key principle of the self cleaning filter arrangement would be maintained as the key feature of any sludge retrieval head design configuration.

The sludge retrieval head 10 can be used underwater and in highly contaminated situations. The drive assembly can be held out of the liquid, and a quick release mechanism (undoing the bolts 22) employed to remove and dispose of the lower (under water) section 20, thus retaining the more expensive section (drive unit/upper unit 12) for use with another lower section 20.

This sludge removal head 10, if it is to be used in a radioactive environment, is preferably made from radiation tolerant materials e.g. stainless steel, and the drive unit 24 is hydraulic to remove the requirement for electric motors etc. with radiation tolerant cabling. The system has been designed for ease of decontamination. The design allows for ease of wash and wipe down so that liquor and contamination can be easily removed.

The invention can be adapted to any environment and the head designed to any configuration to suit the particular application.

Typically this sludge retrieval head can be fixed to or slung from any suitable structure e.g. a floating structure, a driven structure such as an OHTC (Overhead travelling Crane) over a storage pond or a mobile structure such as a crane on wheels/tracks.

Figure 3:
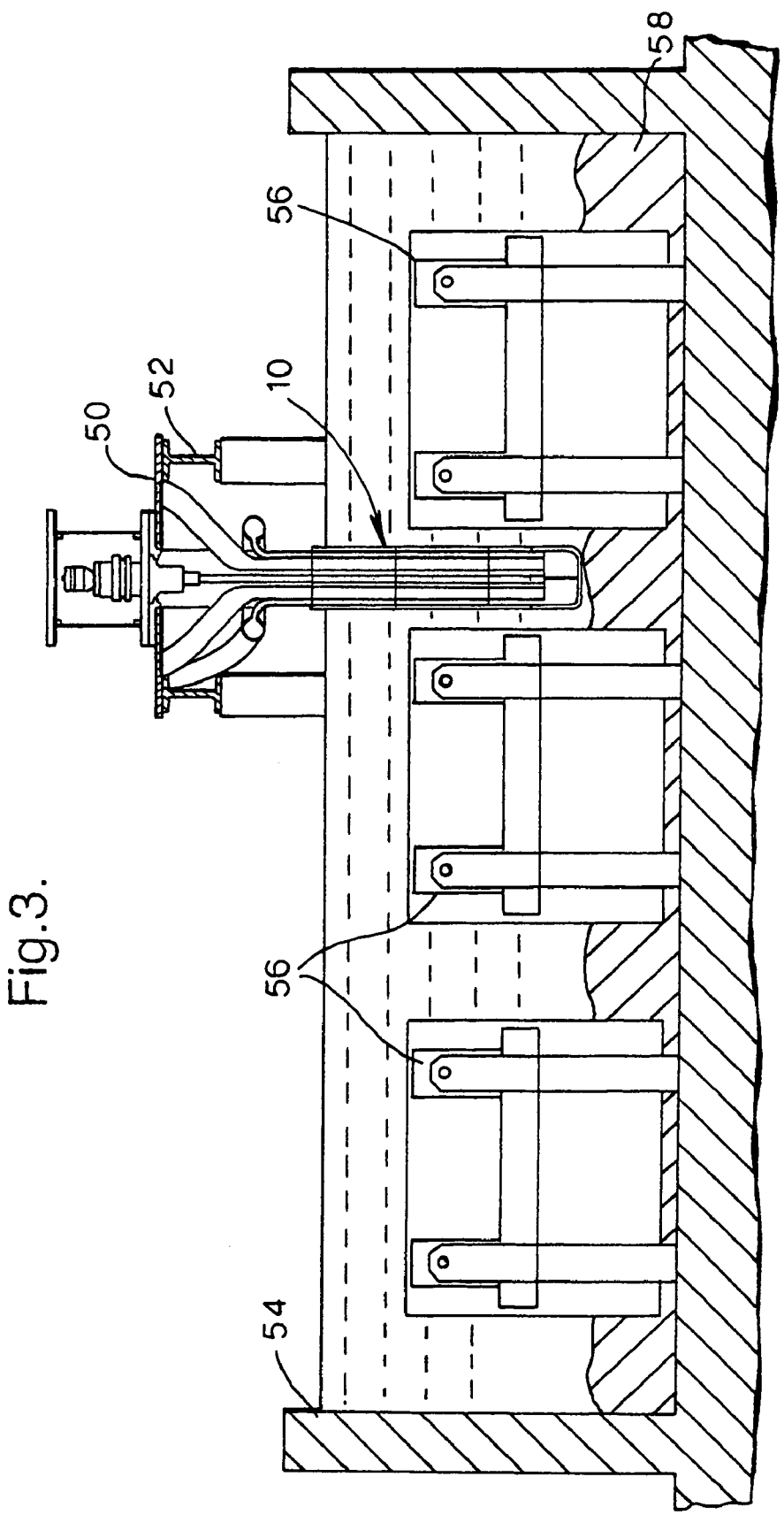
FIG. 3 shows a diagrammatic side view of a sludge removal head of FIG. 1 supported on a gantry for removing sludge from an above-ground storage pond.

Referring to FIG. 3, a sludge removal head 10 as shown in FIG. 1 is supported on a gantry 50 on girders 52 which extend above the top of an above-ground used nuclear fuel storage tank 54. The tank 54 is built of concrete, and encloses a number of metal skips 56 which hold individual fuel elements. The sludge removal head 10 is of such a width that it can be lowered from the gantry 50 into the gaps between adjacent skips 56 to remove sludge 58.

Figure 4:
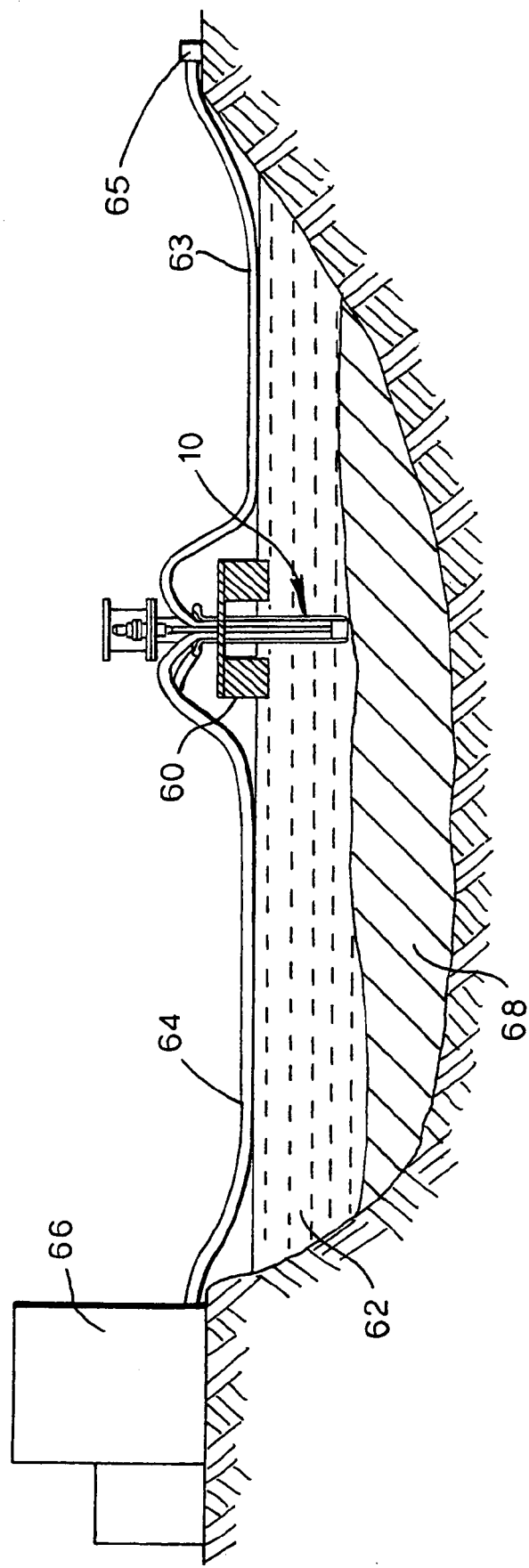
FIG. 4 shows a diagrammatic view of a sludge removal head of FIG. 1 on a floating platform.

Referring now to FIG. 4, a sludge removal head 10 as shown in FIG. 1 is supported on a floating platform 60 which floats on a storage pond 62. In this case flexible hoses 63, 64 to carry pressurised water to the sludge removal head 10, and to carry away the sludge, respectively, can extend to processing units 65, 66 on the land adjacent to the pond 62. The platform 60, and with it the sludge removal head 10, can be moved throughout the storage pond 62 to retrieve deposited sludge 68. By way of example, the processing unit 66 which pumps out the sludge 68 may subject the retrieved sludge to dewatering, for example using a hydrocyclone, and then pipe the sludge into storage tanks (not shown).

Figure 5:
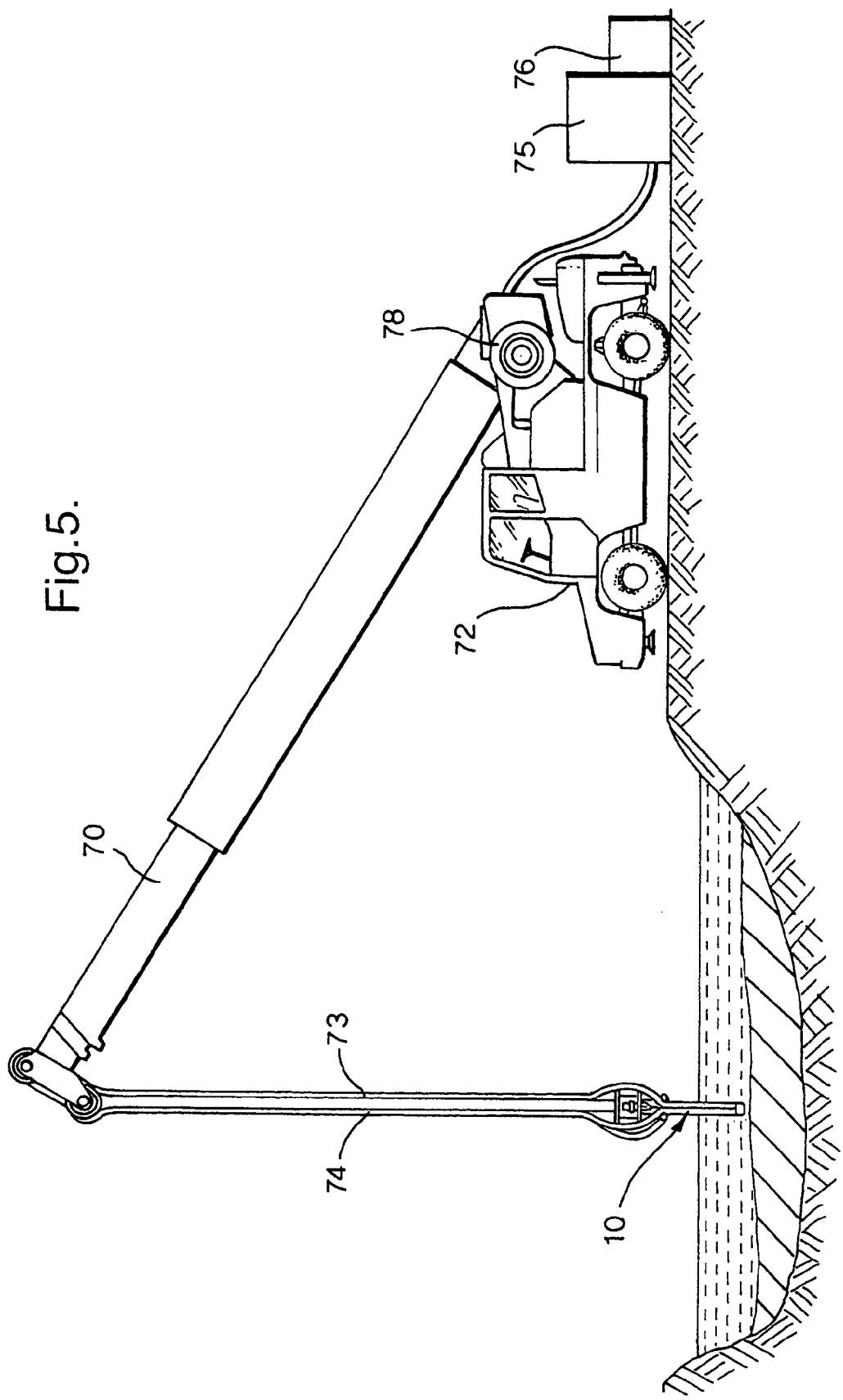
FIG. 5 shows a diagrammatic view of a sludge removal head of FIG. 1 supported by a crane.

Referring now to FIG. 5, a sludge removal head 10 an shown in FIG. 1 is, in this case, supported from an extendable arm 70 of a crane 72, being suspended by the flexible hoses 73 and 74 which carry pressurised water to the sludge removal head 10, and carry away the sludge, respectively. These hoses 73 and 74 extend to processing units 75 and 76 on the ground adjacent to the crane 72. In this case the crane 72 may include reels 78 carrying lengths of these hoses 73 and 74.

It will be appreciated that in situations such as those described in FIG. 3 and 5, the sludge removal head 10 must be connected to a hose or pipe through which the sludge is extracted. It must also be provided with a supply of pressurised water, and means to operate the drive motor. As described above, these may be hoses that extend to a convenient location for processing units. Alternatively in some cases water may be extracted from the pond in the vicinity of the sludge removal head 10, and pressurised by a pump; in this case an umbilical cable may supply power to the sludge removal head 10 both for operating the pump and for operating the drive motor; the power may be supplied electrically, hydraulically or pneumatically through such an umbilical. Thus power can be derived from fixed hydraulic power packs and electrical supplies but may instead utilise remote power supplies such as a diesel generator.

The personnal operating the system can do so by remote control to prevent radiological dose uptake and reduce the likelihood of being contaminated.

Flow rates for the filter wash and fluidising water can be infinitely varied i.e. increased/decreased as required to match at the requirements of the sludge characteristics and the debris. The sludge/effluent retrieval flow can also be increased/decreased to match the requirements of the sludge characteristics and in accordance with the water flow. The rotation of the mesh filter can also be adjusted to optimise performance and meet differing conditions.

As mentioned above, the wash and fluidising water may be derived from the storage pond or lake/canal, etc. The extracted sludge and water can be pumped to settlement tanks, or can be passed through a cyclone system to allow the sludge to be piped to storage tanks, so the water can be returned to the storage pond/lake. The tanks/cyclone system can be positioned onboard the floating platform or crane structure, or as mentioned above may be on the land nearby.

I claim:

1. A sludge removal apparatus incorporating a filter defining a multiplicity of apertures through which fluidized sludge can pass, means for fluidizing sludge in the vicinity of a front face of said filter, and means for backwashing said filter during operation, the apparatus further comprising a sludge removal head incorporating a sludge suction duct and a water supply duct with open end portions alongside each other, said filter being adjacent to the open ends of the suction duct and the water supply duct and said apparatus comprising a mechanism for moving said filter so that regions of said filter pass successively over said open end portions of said suction duct and then of said water supply duct.

2. A sludge removal apparatus as claimed in claim 1 wherein said mechanism for moving said filter incorporates a hydraulic or pneumatic drive motor.

3. A sludge removal apparatus as claimed in claim 1 wherein said filter is rotated by said mechanism.

4. A sludge removal apparatus as claimed in claim 1 wherein said means for fluidizing sludge comprises means for generating at least one water jet.

5. A sludge removal apparatus as claimed in claim 4 wherein the open end portion of said water supply duct generates said at least one water jet.

6. A sludge removal apparatus as claimed in claim 4 also incorporating at least one outlet for forming a water jet adjacent to a periphery of said filter.

7. A sludge removal, apparatus as claimed in claim 1 also incorporating a cage the for protecting said filter.

* * * * *